(12) United States Patent
Rose

(10) Patent No.: US 11,804,044 B1
(45) Date of Patent: Oct. 31, 2023

(54) INTELLIGENT CORRELATION OF VIDEO AND TEXT CONTENT USING MACHINE LEARNING

(71) Applicant: Amazon Technologies, Inc., Seattle, WA (US)

(72) Inventor: Dylan James Rose, Medforn, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/934,033

(22) Filed: Sep. 21, 2022

(51) Int. Cl.
*G06V 20/40* (2022.01)
*H04N 21/488* (2011.01)

(52) U.S. Cl.
CPC .............. *G06V 20/49* (2022.01); *G06V 20/46* (2022.01); *H04N 21/4884* (2013.01)

(58) Field of Classification Search
CPC ..... G06V 20/49; G06V 20/46; H04N 21/4884
See application file for complete search history.

(56) References Cited

U.S. PATENT DOCUMENTS

| 2017/0228599 A1* | 8/2017 | De Juan | G06V 20/70 |
| 2019/0303499 A1* | 10/2019 | Sharma | G06V 10/761 |
| 2022/0067546 A1* | 3/2022 | Amrani | G06V 10/764 |
| 2022/0138474 A1* | 5/2022 | Verma | G06F 18/2115 |
| | | | 386/241 |

* cited by examiner

*Primary Examiner* — Sunghyoun Park
(74) *Attorney, Agent, or Firm* — Eversheds Sutherland (US) LLP

(57) ABSTRACT

Systems, methods, and computer-readable media are disclosed for systems and methods for intelligent correlation of video and text content using machine learning. Example methods include determining first video content having a first video segment and first text corresponding to the first video segment, generating a first embedded vector using the first video segment and the first text, and determining, using a first machine learning model, a first image relevance score for the first video content based at least in part on the first embedded vector. Example methods may include determining a first text score for the first video content based at least in part on the first embedded vector, determining, using the first image relevance score and the first text score, that the first video segment depicts content of a first undesired category, and causing presentation of a notification indicating presence of content of the first undesired category.

20 Claims, 7 Drawing Sheets

INTELLIGENT CORRELATION OF VIDEO AND TEXT CONTENT USING MACHINE LEARNING

BACKGROUND

Digital content, such as video content, audio content, and the like, may include content or scenes that certain users may wish to avoid. For example, some users may desire to avoid drug content, violent content, certain types of animals, such as snakes, and so forth. Users may not be aware as to whether video content, such as a movie, includes such undesired content. Moreover, may not be aware as to when specifically such content may appear in the movie. In addition, different users may have different levels of sensitivity as to different types of content. Accordingly, intelligent correlation of video and text content using machine learning may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
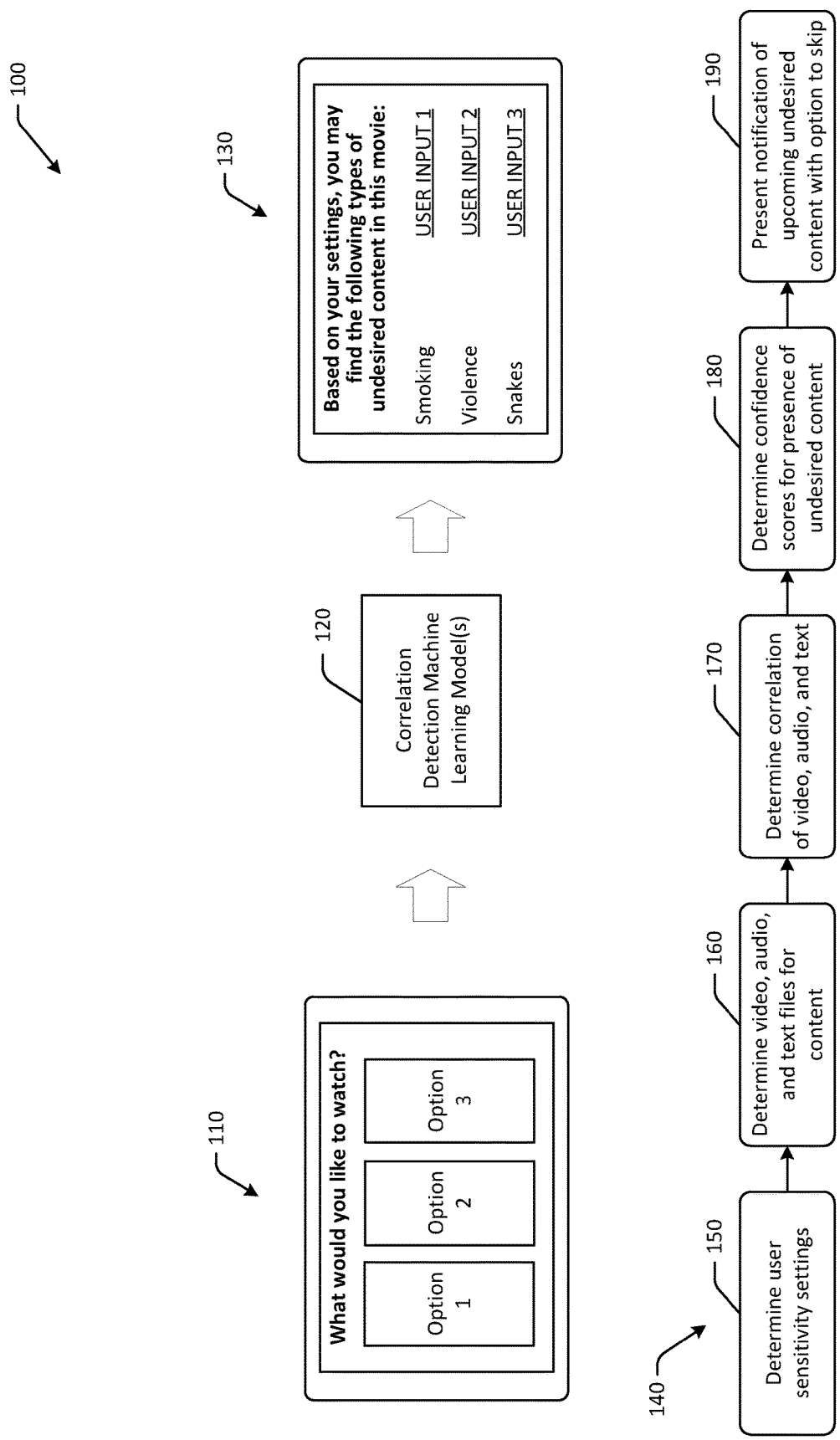
FIG. 1 is a schematic illustration of an example use case for intelligent correlation of video and text content using machine learning in accordance with one or more example embodiments of the disclosure.

Different users may have different sensitivities for different types of content that may appear in video content, such as movies, television shows, and so forth. For example, some users may be sensitive to nudity and violence, but may find spiders and tarantulas acceptable, whereas other users may be sensitive to snakes but may find spiders acceptable. Users may find general content ratings directionally accurate, but such ratings may not provide sufficient detail for users to determine whether content is acceptable for viewing. Moreover, if only certain segments of the content include undesired content for a user, the user may desire to skip only those segments instead of avoiding the video content in its entirety (e.g., the user may still watch a move and desire to skip only segments with undesirable content, etc.)

However, processing content with such user-specific undesired content scanning may be time consuming and difficult with typical systems, and may rely heavily on manual effort. In addition, determining which portions or segments include certain types of undesired content may be problematic without manual tagging and/or manual operator effort.

Embodiments of the disclosure include intelligent correlation of video and text content using machine learning, where content, such as movies, shows, etc. can be scanned for undesired content by a specific user. Segments of the content that include content a user desires to avoid viewing can be flagged via timestamps. Some embodiments may generate and present notifications of upcoming undesirable content to alert a user viewing the content. Embodiments may include an option to skip the upcoming segment of content. Certain embodiments may perform one or more smoothing functions to prevent a jarring experience for a user viewing the content when portions are skipped. Due to the lightweight nature of the machine learning algorithms and/or content processing algorithms described herein, content can be processed at runtime (e.g., when a user selects content for playback, etc.), and can be scanned using user-specific sensitivity levels to determine whether to flag any segments of content for the user and/or to determine whether to present options to skip one or more identified segments. Embodiments may be configured to identify segments of video content that include content such as nudity, negative sentiment, themes, language, violence, and/or other types of content.

Embodiments of the disclosure include systems and methods for intelligent correlation of video and text content using machine learning. Certain embodiments may automatically determine generate notifications for certain undesired segments of content, such as video content (e.g., movies, television programs, streaming content, etc.), audio content (e.g., music, etc.), and the like. Some embodiments may analyze content to determine the presence of undesired content based on user-specific preferences. For example, certain embodiments may perform a frame-by-frame analysis of video content, along with natural language processing of audio content that corresponds to the video content, to determine whether the text and/or audio correlates to what is presented in a video frame, and can subsequently generate notifications and/or options to skip content. Embodiments can therefore allow for individualization of content sensitivity and therefore improves individual user experiences during consumption of content.

This disclosure relates to, among other things, devices, systems, methods, computer-readable media, techniques, and methodologies for intelligent correlation of video and text content using machine learning. In some instances, machine learning (e.g., deep neural networks, etc.) may be used to identify various elements of content that correspond to undesired content for a user, and output may be used to determine whether the content should be flagged for the user. Certain embodiments may include multi-tiered machine learning algorithms, in which a first machine learning algorithm determines correlation between text and video, and a second machine learning algorithm configured to determine the presence of undesired features. A feedback loop may be used to continually improve accuracy of the machine learning model(s), which may include feedback from customers, operators, or other users.

Referring to FIG. 1, an example use case 100 for intelligent correlation of video and text content using machine learning is depicted in accordance with one or more example embodiments of the disclosure. For example, at a first user interface 110 presented at a user device in FIG. 1, a user may select digital content for consumption. For example, a user may select a movie, show, television episode, streaming segment, and so forth. The digital content may include a video component, an audio component, and a text component (e.g., a subtitles file, metadata, synopses of the content, etc.).

One or more correlation detection machine learning models 120 may be stored at a remote server and may be executed to determine whether text for a certain portion of the content is correlated with frames of the corresponding video segment for the identified content. For example, the correlation detection machine learning model(s) 120 may be executed by a computing system to analyze the digital content and to output one or more notifications and/or additional information for the digital content. If a probability value or confidence score indicating that the text is found to correlate with the content of the corresponding video frames satisfies a confidence threshold, and the segment is found to have undesired content, the segment may be flagged and a notification may be presented to the user before presentation of the content and/or during presentation of the content and just before (e.g., 30 seconds or another predetermined time interval, etc.) the segment is to appear.

For example, as illustrated in FIG. 1, at a second user interface 130, results of the content analysis may be presented. The results may include user input or user selected categories of content, such as clowns, aliens, and/or other features that are undesirable to a specific user, but may not be generally undesirable to other users. The results may be presented before the content is presented and/or during presentation or playback of the content. Some embodiments may include options to skip content as part of the notification and/or separate from the notification of the undesired content. Other embodiments may have additional, fewer, or different types of outputs and/or information presented.

To determine whether content has undesired content for a particular user, an example process flow 140 is presented and may be performed, for example, by one or more remote servers. The remote server and/or computer system may include at least one memory that stores computer-executable instructions and at least one processor configured to access the at least one memory and execute the computer-executable instructions to perform various actions or operations, such as one or more of the operations in the process flow 140 of FIG. 1.

At block 150, user sensitivity settings may be determined. For example, a user may be strongly opposed to viewing snakes, but lightly opposed to viewing violence. Accordingly, changes to a confidence score threshold (as discussed with respect to block 180) may be made for such segments to accommodate user preferences. In this example, the confidence score threshold for snakes may be dropped very low (e.g., 5%, 10%, etc.), such that even a small chance that a snake appears in a scene or segment causes a notification to be generated, whereas the confidence score threshold for violence may be increased (e.g., 85%, 90%, 95%, etc.), such that only scenes with high levels of confidence that violence appears are flagged for notification. Accordingly, embodiments may allow for filtering and/or flagging of content that a user specifically finds undesirable, in addition to general categories that a user may select from.

At block 160, video, audio, and text files for content may be determined. For example, a content identifier may be input or received at one or more remote servers. In other embodiments, content may be sent to the remote servers for analysis. In some embodiments, a user account may be identified, so as to determine user-specific categories of content the user wishes to avoid and/or is sensitive to.

At block 170, a correlation of the video, audio, and text may be determined. For example, certain embodiments may use one or more machine learning modules or algorithms (e.g., object recognition modules, pattern recognition algorithms, etc.) to determine whether the content of a video segment corresponds to content of the text and/or audio. If so, or if a confidence score associated with the correlation satisfies a threshold, the segment may be analyzed to determine whether it includes undesired content. Undesired content may be detected via detection of the presence of one or more features in the content. Features may include, for example, the presence of firearms or drugs in a video file or video component of the content, screaming or explosions in an audio file or audio component of the content, negative language in a text file or text component of the content, and so forth. One or more detection modules may be used to process and/or detect various features in the content.

For example, a nudity detection module may be used to analyze the video of the content in a frame-by-frame analysis to detect the presence of female and/or male nudity in the content. If nudity is detected, the content may be determined to have a nudity feature. The length of time of nudity, the number of instances of nudity, and other data may be determined in some embodiments.

In another example, a violence detection module may be used to analyze the video and/or audio of the content in a frame-by-frame or segment-by-segment analysis to detect the presence of violence, as determined via the presence of certain objects (e.g., firearms, military personnel, weapons, etc.), explosions, blood, and other instances of violence. If violence is detected, the content may be determined to have a violence feature, and the length of time or amount of violence, as well as a level of graphicness, may be determined in some embodiments.

Certain embodiments may include a facial recognition module that may be used to analyze video and/or audio of the content in a frame-by-frame or segment-by-segment analysis to detect the presence of negative facial sentiment. For example, sentiments such as anger, fear, disgust, and the like may be determined to be negative, and may be determined to be present using one or more facial recognition modules.

An audio processing module may be used to determine the presence of screaming, explosions, and other instances of audio events that may indicate certain actions occurring within a corresponding frame. For example, the audio processing module may parse or segment audio associated with the content and identify events or instances of certain indicators or occurrences that may occur within a corresponding frame.

In another example, a semantic role labeling module may be used to analyze, such as parse and process, subtitles, topics, synopses, and/or other text data associated with the content to determine the presence of text features, such as certain language or themes that appear in the content.

Additional modules, such as object recognition modules for certain predefined objects, such as drugs, needles, etc. may be included in some embodiments. In some instances, a module may perform more than one form of analysis. For example, the correlation detection machine learning model(s) 120 may include one or more modules, or may perform the operations of one or more module to determine the correlation.

At block 180, confidence scores for the presence of undesired content may be determined. For example, the correlation between the audio, video, and text may be assigned a confidence score indicative of whether the text and/or audio reflects what is occurring in corresponding video frames. If the confidence score satisfies a confidence score threshold, and the segment is determined to have an undesired feature, the segment may be flagged for a notification.

At block 190, a notification of the upcoming undesired content may be presented with an option to skip. For example, as the user consumes the content and the undesirable segment approaches, a notification may be presented to the user and may include an option to skip the segment, as discussed with respect to FIGS. 5-6. User feedback, for example from manual review or after presenting notifications, may be used as a feedback loop to improve accuracy of the correlation detection machine learning model(s) 120.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain objects and/or presence of certain themes or types of content using one or more machine learning modules or algorithms. As a result of improved functionality, content correlation may be accurately predicted without manual review, and notifications for user-specific undesired content segments can be presented. Embodiments of the disclosure may improve computing efficiency and bandwidth by extracting feature data from content and generating determinations using cosine similarity algorithms and embedded vectors representing features of the content. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
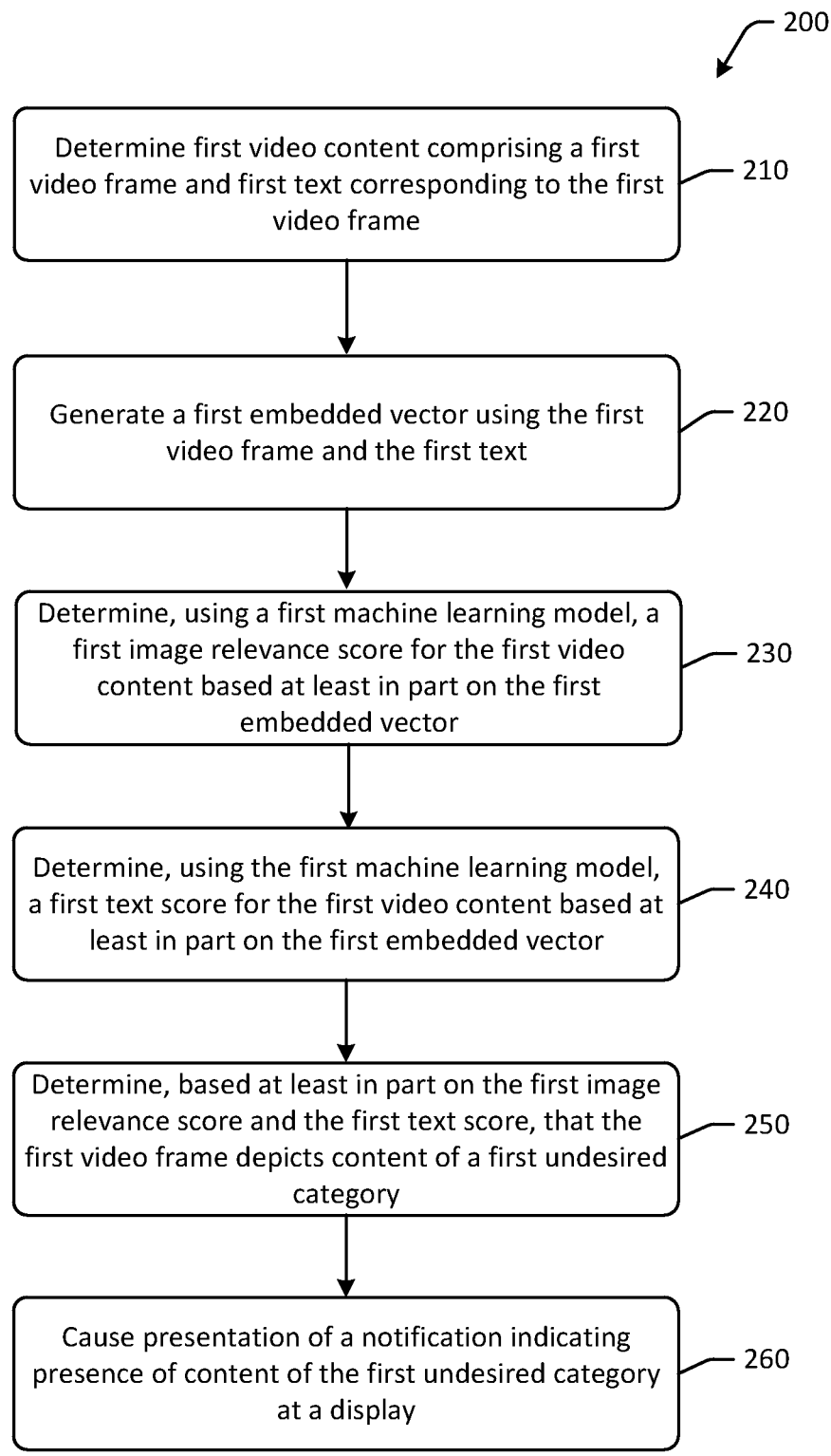
FIG. 2 is a schematic illustration of an example process flow for intelligent correlation of video and text content using machine learning in accordance with one or more example embodiments of the disclosure.

FIG. 2 depicts an example process flow 200 for intelligent correlation of video and text content using machine learning in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine first video content comprising a first video segment and first text corresponding to the first video segment. For example, a remote server may determine first video content comprising a first video segment and first text corresponding to the first video segment. In some embodiments, the remote server may extract video frames, text and timestamp data, and/or audio data from a content file selected for playback. The first video segment may include one or more video frames.

At block 220 of the process flow 200, computer-executable instructions stored on a memory of a device may be executed to generate a first embedded vector using the first video segment and the first text. For example, a remote server may generate a first embedded vector using the first video segment and the first text. The first embedded vector may represented one or more features and/or processing results associated with the video content. In some embodiments, the remote server may analyze individual frames of video content to determine whether certain features are present in the respective frames. Analysis of frames may include processing images using one or more object recognition algorithms, determining pixel color values, comparing certain portions of frames to previous or subsequent frames in the video, and the like. In one example, a drug needle object recognition algorithm may be used to determine that there is a drug needle present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

The text file may be a subtitles file, closed captions file, metadata including a synopsis of the video or portions of the video, actor data, and the like. In some instances, the text file may be generated based at least in part on the audio file of the video (e.g., a speech-to-text conversion of portions of the audio file of the video, etc.). Natural language processing and/or character detection modules or algorithms may be used to determine features such as sentiment of the text, certain predetermined words or phrases (e.g., inappropriate words, cursing, etc.), and other text-based features. For example, a subtitle text file associated with the video may be processed or analyzed using one or more natural language processing algorithms, and a remote server may determine the presence of a predetermined inappropriate phrase in the text file.

Optional audio processing may be included, where the results may also be included in the embedded vector. For example, an audio file associated with video may include audible sounds, such as dialog, sound effects, soundtrack music, and the like corresponding to the video component of the video. The audio file may be analyzed to determine the presence of one or more features. For example, features extracted from, or determined using, audio files may include gunshots, screaming, certain words or language, tone, sentiment, and the like. Analysis of audio content or audio files may include speech-to-text conversions or transcriptions, parsing, and/or natural language processing. In some embodiments, audio content may be segmented into one or more discrete portions for classification and/or analysis. For example, segments may be classified as music, dialog, sound effects, and so forth. Differently classified portions may be analyzed using different signal processing and/or speech-to-text profiles. In some embodiments, natural language processing may be used to determine a meaning of certain portions of audio. In one example, an audio processing algorithm may be used to determine presence of an explosion feature in the audio file. In another example, the same or a different audio processing algorithm may be used to determine presence of screams in the audio file. In another example, presence of audio indicative of a gunshot in the audio file may be determined using a violence audio recognition model. In some embodiments, audio segments may be considered in conjunction with, or instead of, text data. For example, the remote server may determine a first audio segment corresponding to the first video content, and may determine, using the first machine learning model, a first audio score for the first video content based at least in part on the first embedded vector, where generating the first embedded vector includes generating the first embedded vector using the first video segment, the first text, and the first audio segment.

At block 230 of the process flow 200, computer-executable instructions stored on a memory of a device may be executed to determine, using a first machine learning model, a first image relevance score for the first video content based at least in part on the first embedded vector. For example, a remote server may determine, using a first machine learning model, a first image relevance score for the first video content based at least in part on the first embedded vector. The first image relevance score may indicate a correlation between text and video. For example, the first video segment may have a first frame, and the first image relevance score may be indicative of a match between the first text and content depicted in the first frame. If the text correlates to the video, and the text indicates undesired content, the corresponding portion of the video may be flagged for a user.

At block 240, computer-executable instructions stored on a memory of a device may be executed to determine, using the first machine learning model, a first text score for the first video content based at least in part on the first embedded vector. For example, the remote server may determine, using the first machine learning model, a first text score for the first video content based at least in part on the first embedded vector. The first text score may indicate a likelihood the first video segment depicts content of the first undesired category. In some embodiments, the first text score may be a proxy for a confidence score. For example, the first text score may indicate that the corresponding video portion has undesired content, and depending on the correlation, the correct portion of video can be flagged for a user.

At block 250, computer-executable instructions stored on a memory of a device may be executed to determine, based at least in part on the first image relevance score and the first text score, that the first video segment depicts content of a first undesired category. For example, the remote server may determine, based at least in part on the first image relevance score and the first text score, that the first video segment depicts content of a first undesired category. In some embodiments, the scores may be fused or combined together representing a confidence score that on-screen content is undesired. The confidence score(s) may be compared to default or user-specific thresholds to determine whether a user should be notified of the possibility certain types of content are included in the content for presentation, as discussed in detail with respect to FIGS. 3-4. In some embodiments, the remote serve may determine a confidence score based at least in part on the first image relevance score and the first text score, and determine that the confidence score satisfies a confidence threshold.

At block 260, computer-executable instructions stored on a memory of a device may be executed to cause presentation of a notification indicating presence of content of the first undesired category at a display. For example, the remote server may cause presentation of a notification indicating presence of content of the first undesired category at a display. In some embodiments, the remote server may determine that the first video segment depicts content of a first undesired category at a time the first video content is selected for playback due to the lightweight cosine similarity models used for content processing. Example notifications are depicted and discussed in detail with respect to FIG. 6.

Figure 3:
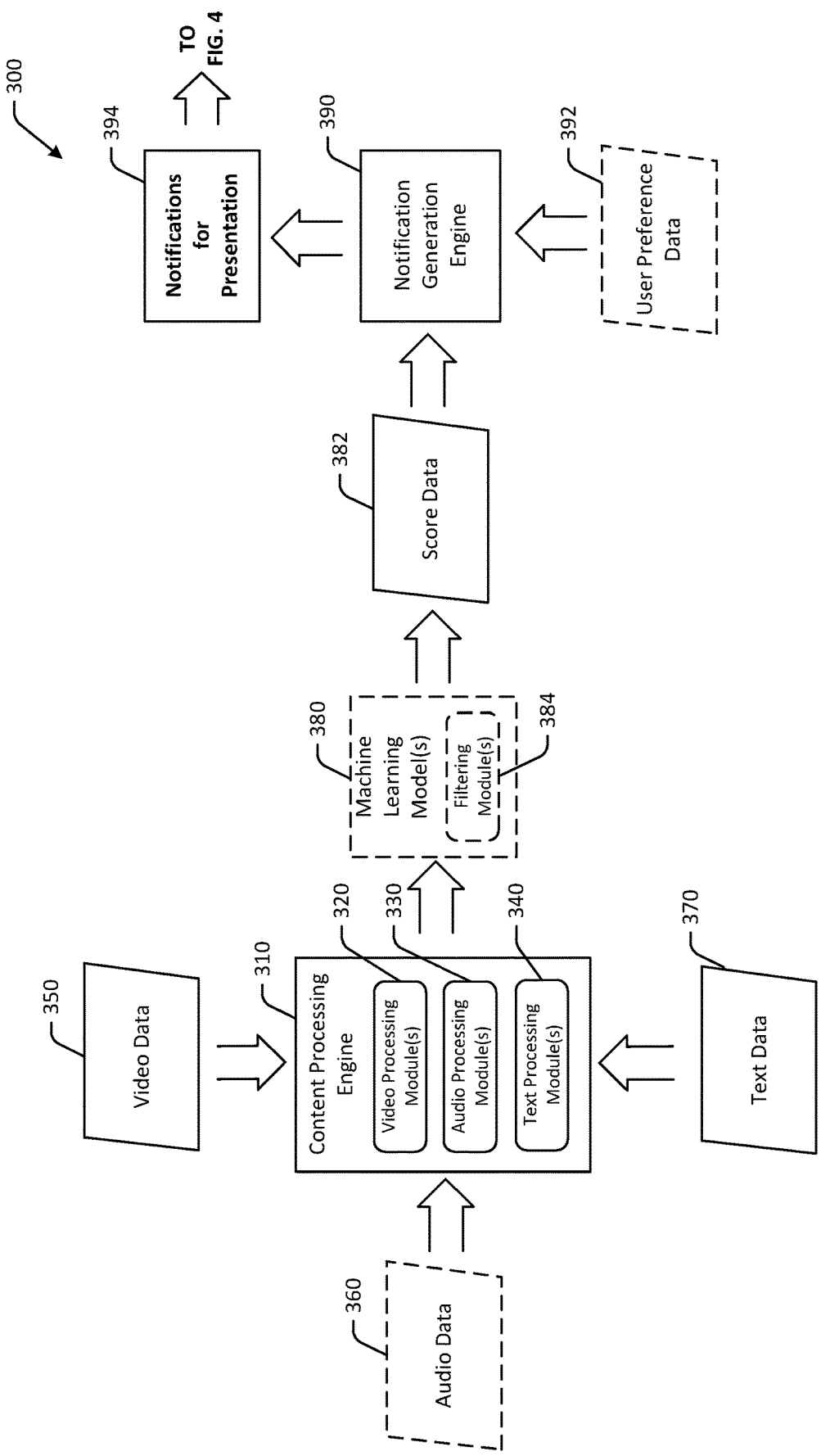
FIGS. 3-4 schematically illustrate an example data flow and machine learning model inputs and outputs for intelligent correlation of video and text content in accordance with one or more example embodiments of the disclosure.
Figure 4:
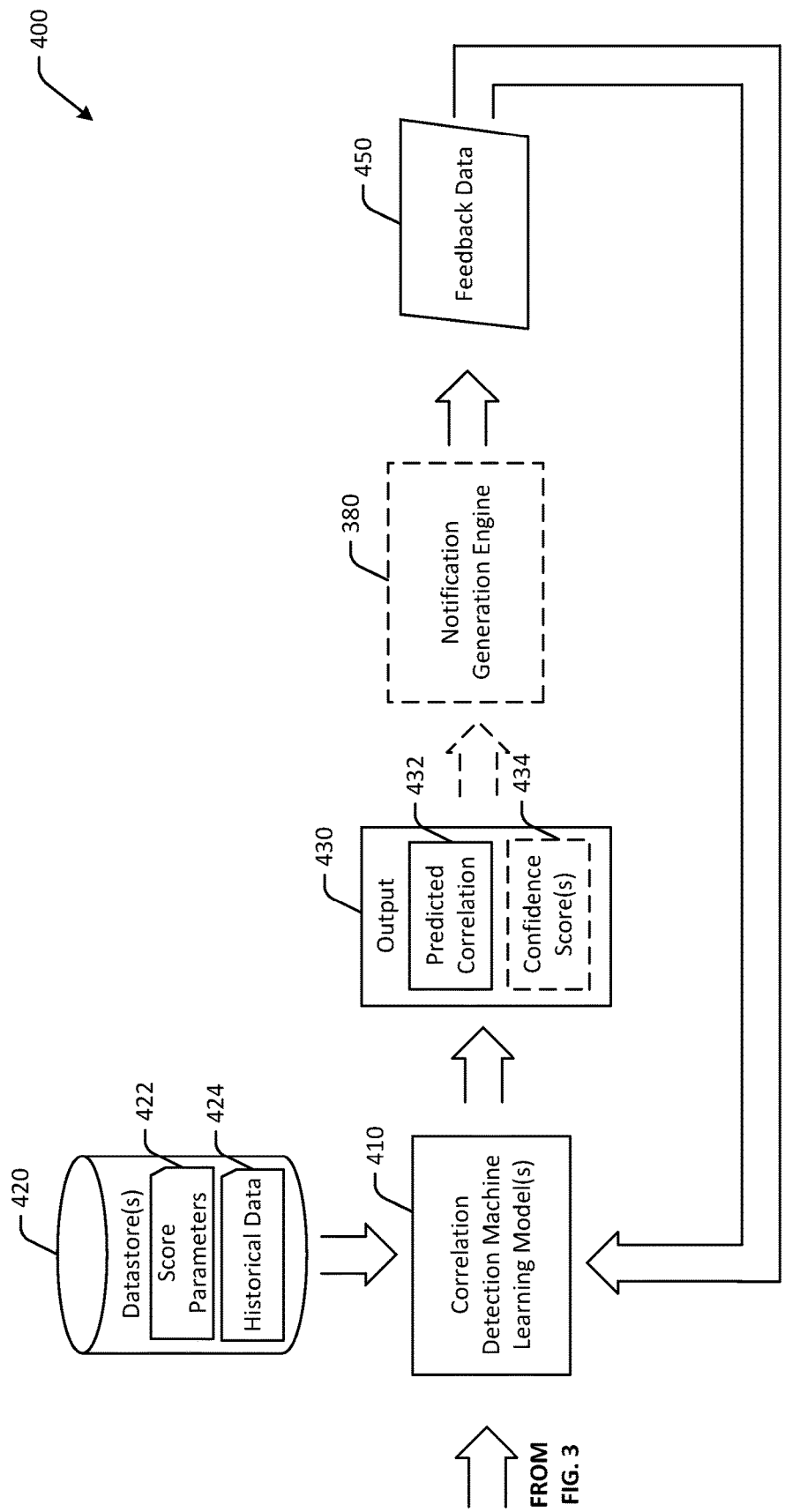

FIGS. 3-4 schematically illustrate an example data flow and machine learning model inputs and outputs for intelligent correlation of video and text content in accordance with one or more example embodiments of the disclosure. Different embodiments may include different, additional, or fewer inputs or outputs than those illustrated in the examples of FIGS. 3-4.

In FIG. 3, an example data flow 300 is schematically depicted. A content processing engine 310 may be configured to extract and/or process video, audio, and/or text components of content. In some embodiments, the content processing engine 310 may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more video processing modules 320, one or more audio processing modules 330, and/or one or more text processing modules 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects or certain types of scenes, which may include nudity, violence, and the like. For example, a video file for a movie may include a first frame, a second frame, and so forth. The video processing module(s) 320 may be configured to detect or analyze sentiment in video content. For example, the video processing module(s) 320 may include facial recognition and/or sentiment detection algorithms that can be used to identify sentiment or themes over frames or segments of the video content. Video processing module(s) 320 may include one or more object recognition algorithms configured to detect at least one of nudity, predefined objects, predefined scenery (e.g., certain locations, etc.), and the like.

The audio processing module(s) 330 may be configured to process and/or analyze audio content, such as audible dialog, sound effects, music, and other audio. In some instances, the audio processing module(s) 330 may be configured to convert audio to text and/or perform natural language processing to determine a meaning of certain portions of audio or its corresponding transcription. The audio processing module(s) 330 may be configured to detect features such as violence (e.g., gunshots, explosions, etc.), sex (e.g., moaning, etc.), explicit language (e.g., presence of certain words or phrases, etc.), sentiment, tone, and/or other features. Audio processing module(s) 330 may include one or more algorithms configured to detect at least one of predefined expressions, predefined sounds, and the like.

The text processing module(s) 340 may be configured to analyze and/or process text content, such as text received from an audio-to-text transcription provided by the audio processing module(s) 330, closed captions or subtitles associated with content, content summaries or synopses, chapter or section titles or descriptions, and/or other data or metadata associated with content. The text processing module(s) 340 may include one or more natural language processing modules or algorithms and may be configured to detect or determine the presence of features such as certain words or phrases, themes, sentiment, topics, and/or other features. The text processing module(s) 340 may be configured to perform semantic role labeling, semantic parsing, or other processes configured to assign labels to words or phrases in a sentence that indicate the respective word or phrase's semantic role in a sentence, such as object, result, subject, goal, etc. Semantic role labeling may be a machine learning or artificial intelligence based process. Text processing module(s) 340 may include one or more algorithms configured to detect a meaning of text-based sentences.

The content processing engine 310 may receive one or more inputs for content for which a predicted content rating is to be generated. For example, the content processing engine 310 may receive one or more of video data 350 associated with content for which correlation score values are to be generated, audio data 360 associated with content for which correlation score values are is to be generated, and/or text data 370 associated with content for which correlation score values are to be generated. In some embodiments, the video data 350, audio data 360, and/or text data 370 may be extracted from a content file.

The content processing engine 310 may process the respective data associated with the content for which correlation score values are to be generated. For example, the video data 350 may be processed using one or more of the video processing module(s) 320, the audio processing module(s) 330, and/or the text processing module(s) 340. Likewise, the audio data 360 and/or the text data 370 may be processed using one or more of the modules or algorithms of the content processing engine 310. In some embodiments, the content processing engine 310 may be configured to generate an embedded vector with audio, text, and/or video processing data.

Using one or more algorithms or modules, the content processing engine 310 may determine the presence of one or more features in the content. The detected feature data may indicate the feature detected in the respective audio, video, and/or text data of the content. For example, the detected feature data may include data related to a number of instances of nudity, a number of instances of curse words, a length of violent scenes, a type of violence, a type of drug use, types of themes, types of sentiment, and other features that may be detected in the audio, video, or text of the content. The content processing engine 310 may output detected feature data to one or more machine learning model(s) 380, such as a correlation detection machine learning model(s) 410 of FIG. 4 (e.g., the machine learning model(s) 380 and the correlation detection machine learning model(s) 410 may be the same in some embodiments, etc.). The machine learning model(s) 380 may include one or more modules, such as an optional filtering module(s) 384, which may be configured to fuse multiple values into a single representative value. For example, the filtering module(s) 384 may be configured to implement a Kalman filter for signal fusion. The machine learning model(s) 380 may be configured to receive the output from the content processing engine 310 as one or more inputs, and may generate score data 382. The score data 382 may be one or more score values indicative of a confidence level that the audio and/or text correlates to what occurs in a corresponding video frame, where the greater the confidence score, the greater a likelihood of correlation. The score data 382 may be input at a notification generation engine 390 as an input, where optional user preference data 392 may also be input at the notification generation engine 390. The notification generation engine 390 may use the score data 382 and the optional user preference data 392 to determine whether to present a notification for certain segments of content to a particular user. For example, the user preference data 392 may include user sensitivity settings for different types or categories of content the user in particular is sensitive to. The greater the sensitivity, the notification generation engine 390 may reduce the confidence score threshold accordingly, such that notifications are still presented for segments with relatively low confidence scores. In contrast, for types or categories of content where the user is not as sensitive, the notification generation engine 390 may increase the confidence score threshold accordingly, such that notifications are not presented for segments with relatively low confidence scores. The notification generation engine 390 may output notifications for presentation 394, which may include corresponding times or timestamps at which the notifications are to be presented during playback of the content.

The notifications for presentation 394 output from the notification generation engine 390 and/or machine learning model(s) 380 may be fed as an input to the one or more correlation detection machine learning model(s) 410 illustrated in FIG. 4. In some embodiments, the content processing engine 310 may include the machine learning model(s) 380 and/or the correlation detection machine learning model(s) 410.

In FIG. 4, an example data flow 400 is schematically depicted. The notifications for presentation 394 may be input at the correlation detection machine learning model(s) 410. In some embodiments, the score data 382 may be input at the correlation detection machine learning model(s) 410. The correlation detection machine learning model(s) 410 may be configured to generate output 430, which may include a predicted correlation value 432 and/or a confidence score 434.

One or more datastores 420 may include data that may be input at, or otherwise accessed by, the correlation detection machine learning model(s) 410 to determine the output 430. For example, the datastore 420 may include score parameters 422 that may indicate which features may affect or impact correlation values. The datastore 420 may include historical score data 424, which may be indicative of previous correlation values by the correlation detection machine learning model(s) 410, and subsequent user feedback, and may be used to improve accuracy of correlation determinations. In some embodiments, the historical data 424 may include manual correlation values associated with content, which may be used for initial model training and/or feature extraction.

The correlation detection machine learning model(s) 410 may be configured to output one or more values. For example, output 430 of the correlation detection machine learning model(s) 410 may include one or more predicted correlation values 432 (e.g., an indication on whether the contents of a frame match subtitle text, etc.), respective confidence scores 434 for correlation values, and/or additional, fewer, or different outputs. In some embodiments, the values 432, 434 may be fused or combined together into a single value, such as via a Kalman filtering process.

The confidence scores 434 may be determined based at least in part on a likelihood that the correlation value is accurate. The confidence score may be determined based at least in part on the particular features detected in the content, as well as the training data used to train the correlation detection machine learning model(s) 410. Confidence scores may be determined based at least in part on presence of one or more of the detected features being present in a set of training data for the machine learning model.

In some embodiments, the output 430 may be input to a notification generation engine 380, which may be the same instance or another instance (e.g., a retrained instance, etc.) of the notification generation engine 380 of FIG. 3. As notifications are presented, users may provide feedback as to whether the notification was appropriate (e.g., did undesired content actually appear, was the length of content skipping appropriate or too short or long, etc.). Such user and/or manual review feedback may be aggregated as feedback data 450. For example, users may indicate whether or not they agree with the notification. Such indications may be fed back as feedback loops or inputs at the correlation detection machine learning model(s) 410. The feedback data 450 may be used to improve the accuracy of future correlation determinations and/or confidence scores output by the correlation detection machine learning model(s) 410. The feedback data 450 may be used to retrain and/or incrementally train the filtering module(s) 384. For example, weighting and/or bias values used by the filtering module(s) 384 may be modified based at least in part on the feedback data 450.

As a result, correlation determinations output by the correlation detection machine learning model(s) 410 may improve over time as additional user feedback data is received, and more data is captured to determine the relationships between the various features present in content and the related impact on correlation. In some embodiments, the system may receive feedback data, where the feedback data includes an indication that presence of content of the first undesired category is inaccurate. The system may use the feedback data associated with the presentation of the notification to retrain the machine learning model(s).

Figure 5:
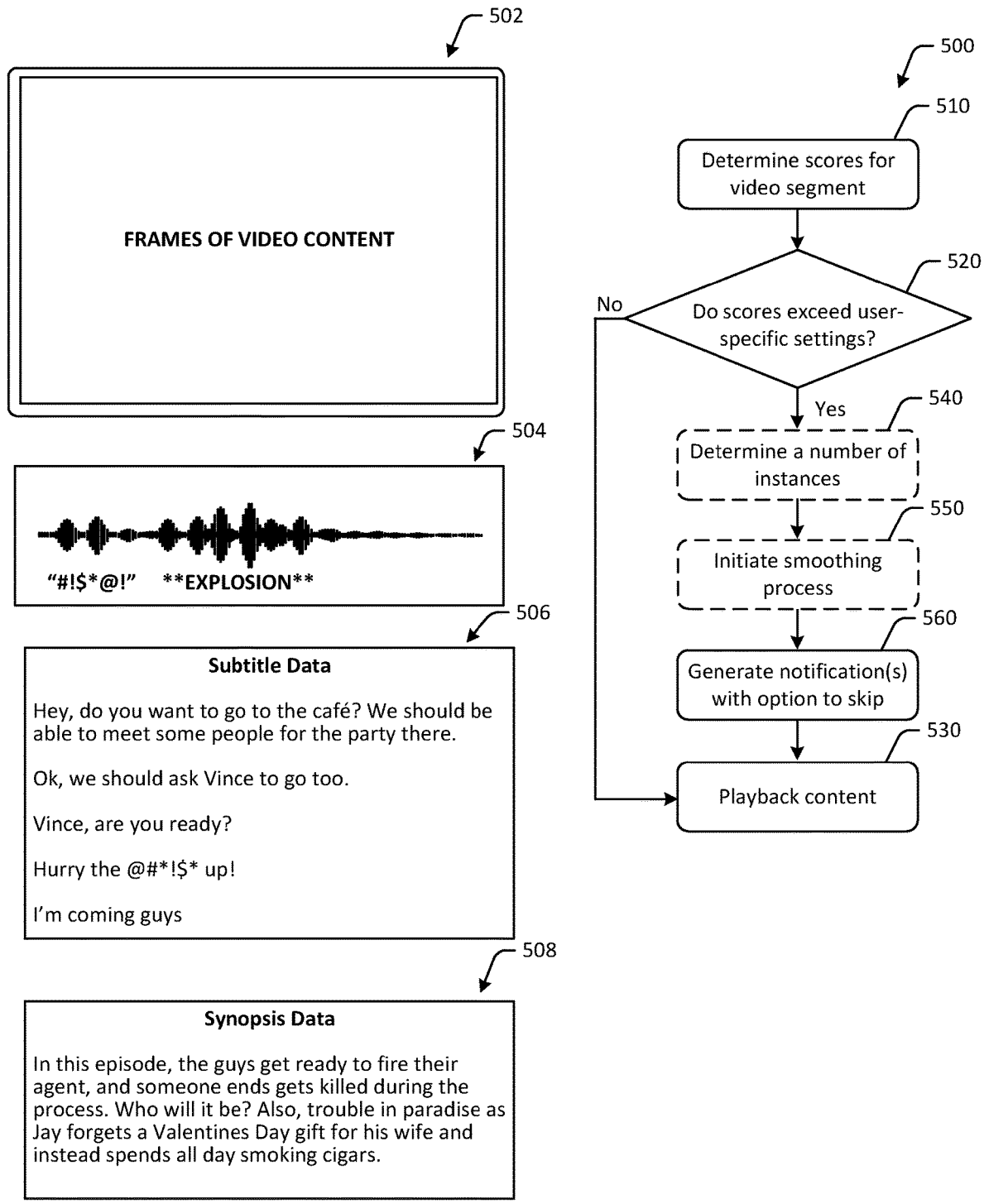
FIG. 5 is a schematic illustration of example video component inputs and an example process flow for determining whether to present notifications in accordance with one or more example embodiments of the disclosure.

FIG. 5 is a hybrid schematic illustration of example video component inputs and an example process flow 500 for determining whether to present notifications in accordance with one or more example embodiments of the disclosure. While example embodiments of the disclosure may be described in the context of frames or images, it should be appreciated that the disclosure is more broadly applicable to any suitable portion of digital content. Some or all of the blocks of the process flows in this disclosure may be optional and may be performed in a distributed manner across any number of devices. The operations of the process flow 500 may be performed in a different order. The process flow 500 may be executed to determine whether to present a notification for certain segments of content.

In FIG. 5, the example process flow 500 may include block 510 at which scores may be determined for a video segment. The scores may include one or more correlation scores and/or confidence scores indicative of a likelihood of accuracy of the correlation scores. In some embodiments, the scores may be combined into a single score for a scene, which may be described as a confidence score. At determination block 520, the system may determine whether the scores exceed user-specific settings. The settings may be individual for different types of content. For example, a confidence score threshold for snakes may be 90%, whereas a confidence score for nudity may be 25% for a particular user. Users may apply their own settings. The confidence score for a segment with nudity may be compared to the corresponding threshold, and may be repeated for different potentially undesired content that appears in the video. In some embodiments, the system may determine a confidence score based at least in part on a first image relevance score and a first text score, and may determine that the confidence score satisfies a confidence threshold. The confidence score may be customizable, and may be determined using user preferences associated with a user account. The user preferences may include one or more confidence thresholds that are associated with different undesired categories. If the score for nudity or other type of content does not exceed the user-specific setting, the process may end at block 530, at which the content and particular segment is presented without a notification. If the score for nudity or other type of content does meet or exceed the user-specific setting, the process may continue to optional block 540 at which a number of instances may be determined. At optional block 550, a smoothing process may be initiated, which may smooth transitions in video content that is presented to avoid a lurching effect, and may also smooth presentation of notifications, such as by aggregating notifications for content close in time, so as to avoid continuous presentation (e.g., back-to-back notifications can be bundled together as one, and the entire segment can be skipped, etc.). In some embodiments, the system may determine that a number of instances content of the first undesired category appear in the first video content is greater than a smoothing threshold, and may determine an increased confidence threshold for the first video content to reduce a number of notifications associated with the first video content. At block 560, a notification regarding upcoming undesired content is generated with an option to skip the content, as discussed with respect to FIG. 6. The process flow 500 may then end at block 530, where the content is presented with notifications as appropriate.

Features of video content may be detected via analysis of video frames 502, audio data 504, text data 506, such as subtitle text or synopsis data 508, and the like. Examples of such inputs are presented in FIG. 5, where the audio may include explosions that can be correlated to on-screen violence, subtitle data that can be correlated to on-screen language or violence, synopsis data that can be correlated to general video sentiment, and so forth.

Figure 6:
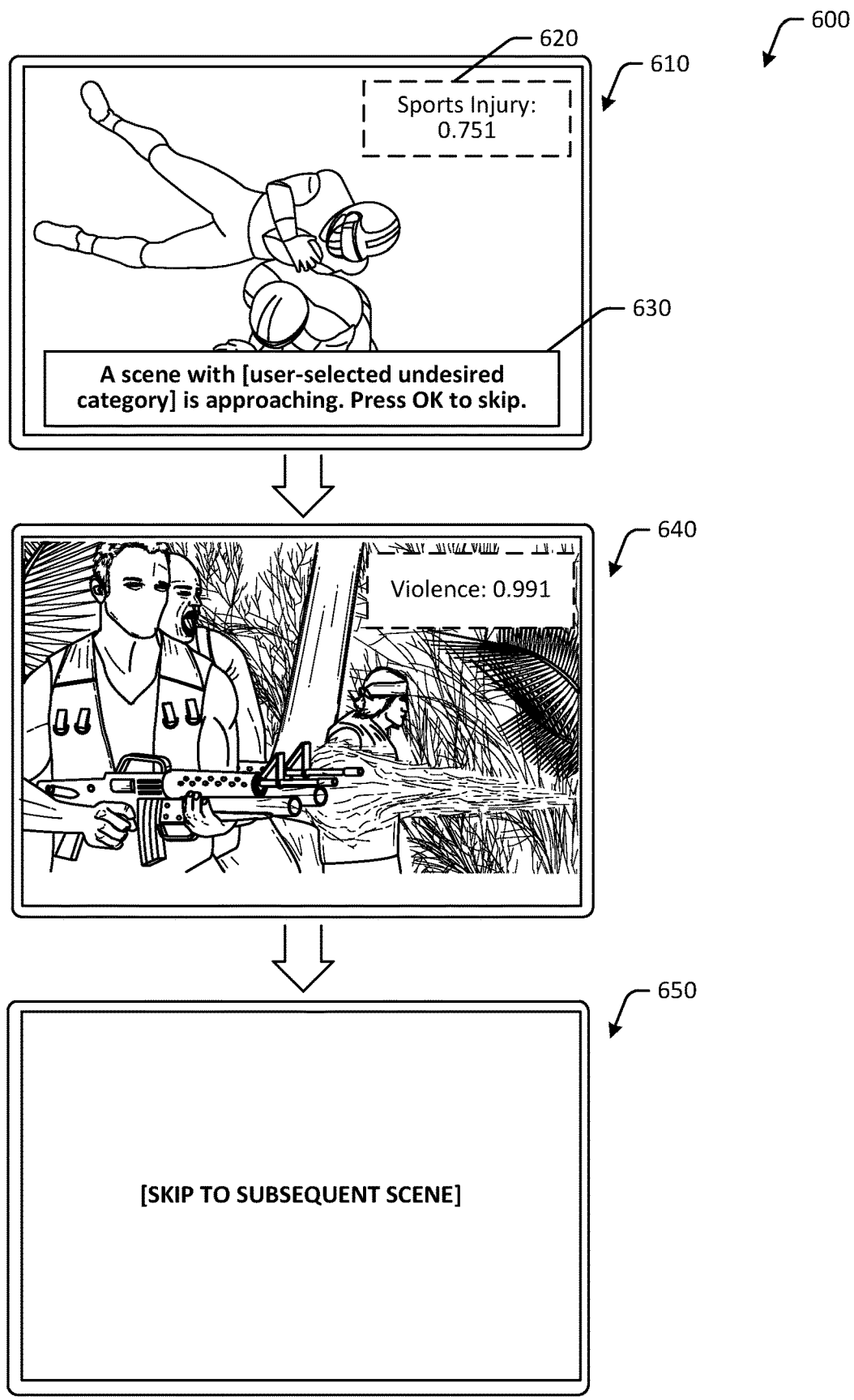
FIG. 6 is a schematic illustration of example user interfaces for presentation during content playback in accordance with one or more example embodiments of the disclosure.

FIG. 6 is a schematic illustration of example user interfaces 600 for presentation during content playback in accordance with one or more example embodiments of the disclosure. While example embodiments of the disclosure may be described in the context of frames or images and audio, it should be appreciated that the disclosure is more broadly applicable to any suitable portion of digital content. Other embodiments may have different features.

In FIG. 6, a user may be consuming content that includes segments of undesired categories as determined based on user settings. During playback of the content, at a first scene 610, a scene with a sports injury may be presented, where a confidence score 620 indicating that an on-screen sports injury is occurring is 75.1%. The confidence score 620 may or may not be presented during playback. However, the user may not be sensitive to sport injuries, and the content may therefore be presented. However, an upcoming scene 640 may include violence with a confidence score of 99.1%, and the user may be sensitive to violence. Accordingly, the system may cause presentation of a notification 630 at the first scene 610 indicating that a scene with [violence] or other undesired category is approaching. The notification 630 may include an option to skip the upcoming scene. If the user selects the option, the violent scene 640 may be skipped and content playback may jump or fast forward to a forward scene 650. In some embodiments, the skipped scene may be skipped entirely, whereas in other embodiments, the skipped scene may be presented at a high rate of presentation, such as 10X normal speed, etc. The notification 630 may be presented during playback of the first video content within a predetermined time interval prior to presentation of the undesired segment, such as about 30 seconds. During playback of the first video content, an option to skip the undesired segment may be presented.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
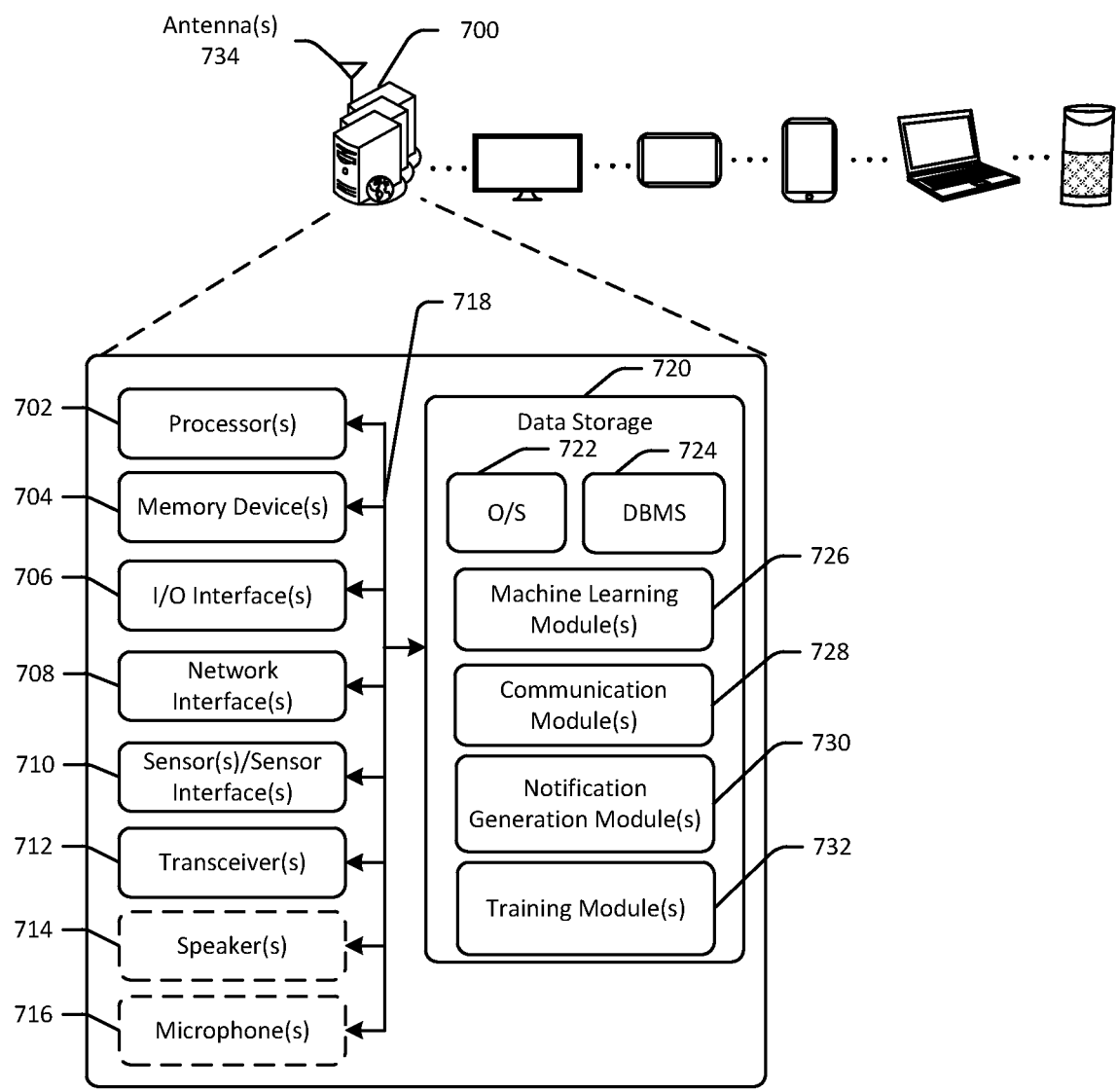
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of correlation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(s) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage.

The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more machine learning module(s) 726, one or more communication module(s) 728, one or more notification generation module(s) 730, and/or one or more training module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user feedback information, user profile information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the machine learning module(s) 726 may include computer-executable instructions, code, or the like that responsive to execution by one or more of the processor(s) 702 may perform functions including, but not limited to, determining training data sets, determining model accuracy, generating one or more machine learning models or algorithms, determining content ratings, determining frames of content, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or search queries/content rating results, communicating with cache memory data, and the like.

The notification generation module(s) 730 may include computer-executable instructions, code, or the like that responsive to execution by one or more of the processor(s) 702 may perform functions including, but not limited to, analyzing digital content, extracting frames, generating notifications, determining timing of notifications, determining or analyzing text or audio files, identifying certain portions of content, and the like.

The training module(s) 732 may include computer-executable instructions, code, or the like that responsive to execution by one or more of the processor(s) 702 may perform functions including, but not limited to, receiving feedback signals, aggregating feedback data, generating datasets, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(s) 734 may include any suitable type of antenna depending, for example, on the communications protocols used to transmit or receive signals via the antenna(s) 734. Non-limiting examples of suitable antennas may include directional antennas, non-directional antennas, dipole antennas, folded dipole antennas, patch antennas, multiple-input multiple-output (MIMO) antennas, or the like. The antenna(s) 734 may be communicatively coupled to one or more transceivers 712 or radio components to which or from which signals may be transmitted or received.

As previously described, the antenna(s) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 734 may be configured to transmit or receive radio frequency signals within any suitable frequency range forming part of the unlicensed portion of the radio spectrum.

The antenna(s) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(s) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, a video file for a movie, the video file comprising first video segment and first text corresponding to the first video segment;
   generating a first embedded vector using the first video segment and the first text;
   determining, using a first machine learning model, a first image relevance score for the first video content based at least in part on the first embedded vector;
   determining, using the first machine learning model, a first text score for the first video content based at least in part on the first embedded vector;
   determining a first audio segment corresponding to the first video content; and
   determining, using the first machine learning model, a first audio score for the first video content based at least in part on the first embedded vector;
   determining, based at least in part on the first image relevance score, the first text score, and the first audio segment, that the first video segment depicts content of a first undesired category;
   causing presentation of a notification indicating presence of content of the first undesired category at a display during playback of the first video content; and
   causing presentation of an option to skip the first video segment.

2. The method of claim 1, further comprising:
   determining that a number of instances content of the first undesired category appear in the first video content is greater than a smoothing threshold; and
   determining an increased confidence threshold for the first video content to reduce a number of notifications associated with the first video content.

3. The method of claim 1, wherein the first text score represents a likelihood the first video segment depicts content of the first undesired category, and the first image relevance score is indicative of a match between the first text and content depicted in the first frame.

4. The method of claim 1, further comprising:
receiving feedback data, wherein the feedback data comprises an indication that presence of content of the first undesired category is inaccurate; and
using the feedback data associated with the presentation of the notification to retrain the machine learning model.

5. A method comprising:
determining, by one or more computer processors coupled to memory, first video content comprising a first video segment and first text corresponding to the first video segment;
generating a first embedded vector using the first video segment and the first text;
determining, using a first machine learning model, a first image relevance score for the first video content based at least in part on the first embedded vector;
determining, using the first machine learning model, a first text score for the first video content based at least in part on the first embedded vector;
determining, based at least in part on the first image relevance score and the first text score, that the first video segment depicts content of a first undesired category; and
causing presentation of a notification indicating presence of content of the first undesired category at a display.

6. The method of claim 5, further comprising:
determining a first audio segment corresponding to the first video content; and
determining, using the first machine learning model, a first audio score for the first video content based at least in part on the first embedded vector;
wherein generating the first embedded vector comprises generating the first embedded vector using the first video segment, the first text, and the first audio segment.

7. The method of claim 5, further comprising:
determining a confidence score based at least in part on the first image relevance score and the first text score; and
determining that the confidence score satisfies a confidence threshold.

8. The method of claim 7, wherein the confidence score is customizable, the method further comprising:
determining user preferences associated with a user account;
wherein the user preferences comprise the confidence threshold, and wherein the confidence score is associated with the first undesired category.

9. The method of claim 5, wherein determining that the first video segment depicts content of a first undesired category is performed at a time the first video content is selected for playback.

10. The method of claim 5, wherein the notification is presented during playback of the first video content, and within a predetermined time interval prior to presentation of the first video segment.

11. The method of claim 10, further comprising:
during playback of the first video content, causing presentation of an option to skip the first video segment.

12. The method of claim 5, wherein the first text score represents a likelihood the first video segment depicts content of the first undesired category; and
wherein the first video segment comprises a first frame, and the first image relevance score is indicative of a match between the first text and content depicted in the first frame.

13. The method of claim 5, further comprising:
determining that a number of instances content of the first undesired category appear in the first video content is greater than a smoothing threshold; and
determining an increased confidence threshold for the first video content to reduce a number of notifications associated with the first video content.

14. The method of claim 5, wherein the first text is at least one of: subtitle text or closed caption text.

15. The method of claim 5, further comprising:
using feedback data associated with the presentation of the notification to retrain the machine learning model.

16. The method of claim 15, further comprising:
receiving the feedback data, wherein the feedback data comprises an indication that presence of content of the first undesired category is inaccurate.

17. A device comprising:
memory that stores computer-executable instructions; and
at least one processor configured to access the memory and execute the computer-executable instructions to:
determine first video content comprising a first video segment and first text corresponding to the first video segment;
generate a first embedded vector using the first video segment and the first text;
determine, using a first machine learning model, a first image relevance score for the first video content based at least in part on the first embedded vector;
determine, using the first machine learning model, a first text score for the first video content based at least in part on the first embedded vector;
determine, based at least in part on the first image relevance score and the first text score, that the first video segment depicts content of a first undesired category; and
cause presentation of a notification indicating presence of content of the first undesired category at a display.

18. The device of claim 17, wherein the at least one processor is further configured to access the memory and execute the computer-executable instructions to:
determine a confidence score based at least in part on the first image relevance score and the first text score; and
determine that the confidence score satisfies a confidence threshold.

19. The device of claim 17, wherein the notification is presented during playback of the first video content within a predetermine time interval prior to presentation of the first video segment, and wherein the at least one processor is further configured to access the memory and execute the computer-executable instructions to:
during playback of the first video content, cause presentation of an option to skip the first video segment.

20. The device of claim 17, wherein the at least one processor is further configured to access the memory and execute the computer-executable instructions to:
determine that a number of instances content of the first undesired category appear in the first video content is greater than a smoothing threshold; and
determine an increased confidence threshold for the first video content to reduce a number of notifications associated with the first video content.

* * * * *